United States Patent
Haskell et al.

(10) Patent No.: US 7,092,445 B2
(45) Date of Patent: Aug. 15, 2006

(54) VIDEO CODER PROVIDING IMPLICIT COEFFICIENT PREDICTION AND SCAN ADAPTATION FOR IMAGE CODING AND INTRA CODING OF VIDEO

(75) Inventors: Barin Geoffry Haskell, Tinton Falls, NJ (US); Atul Puri, Riverdale, NY (US); Robert Louis Schmidt, Howell, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 10/331,344

(22) Filed: Dec. 31, 2002

(65) Prior Publication Data
US 2003/0095604 A1 May 22, 2003

Related U.S. Application Data

(63) Continuation of application No. 09/942,734, filed on Aug. 31, 2001, now Pat. No. 6,556,625, which is a continuation of application No. 08/908,044, filed on Aug. 11, 1997, now Pat. No. 6,341,144.

(60) Provisional application No. 60/026,963, filed on Sep. 20, 1996, provisional application No. 60/038,019, filed on Feb. 14, 1997.

(51) Int. Cl.
*H04N 7/30* (2006.01)

(52) U.S. Cl. .................................. 375/240.2

(58) Field of Classification Search ........... 375/240.01, 375/240.03, 240.11–240.16, 240.18, 240.2, 375/240.24; 382/232, 233, 238, 248, 250, 382/268; H04N 7/30
See application file for complete search history.

(56) References Cited

U.S. PATENT DOCUMENTS

| | | | |
|---|---|---|---|
| 2,905,756 A | 9/1959 | Graham | |
| 4,245,248 A | 1/1981 | Netravali et al. | |
| 4,399,461 A * | 8/1983 | Powell | 348/252 |
| 4,717,956 A | 1/1988 | Moorhead et al. | |
| 4,853,775 A * | 8/1989 | Rouvrais et al. | 375/240.16 |
| 5,001,559 A * | 3/1991 | Gonzales et al. | 348/400.1 |
| 5,060,064 A * | 10/1991 | Lamnabhi et al. | 348/443 |
| 5,081,532 A * | 1/1992 | Rabii | 348/452 |

(Continued)

FOREIGN PATENT DOCUMENTS

EP 0 283 715 A2 9/1988

(Continued)

OTHER PUBLICATIONS

See et al, "Efficient Encoding of DC Coefficients in Transform Coding of Images Using JPEG Scheme", *Signal Image and Video Processing*, Jun. 11-14, 1991, vol. 1, No. Symp. 24, Institute of Electrical and Electronics Engineers, pp. 404-407, Singapore.

(Continued)

*Primary Examiner*—Richard Lee

(57) ABSTRACT

A predictive video coder performs gradient prediction based on previous blocks of image data. For a new block of image data, the prediction determines a horizontal gradient and a vertical gradient from a block diagonally above the new block (vertically above a previous horizontally adjacent block). Based on these gradients, the encoder predicts image information based on image information of either the horizontally adjacent block or a block vertically adjacent to the new block. The encoder determines a residual that is transmitted in an output bitstream. The decoder performs the identical gradient prediction and predicts image information without need for overhead information. The decoder computes the actual information based on the predicted information and the residual from the bitstream.

65 Claims, 6 Drawing Sheets

U.S. PATENT DOCUMENTS

| | | | |
|---|---|---|---|
| 5,116,287 A | 5/1992 | Hironaka et al. | |
| 5,117,287 A * | 5/1992 | Koike et al. | 348/416.1 |
| 5,196,933 A * | 3/1993 | Henot | 375/240.2 |
| 5,225,904 A * | 7/1993 | Golin et al. | 375/240.12 |
| 5,329,313 A | 7/1994 | Keith | |
| 5,473,376 A | 12/1995 | Auyeung | |
| 5,561,477 A | 10/1996 | Polit | |
| 5,600,375 A | 2/1997 | Wickstrom | |
| 5,699,119 A * | 12/1997 | Chung et al. | 375/240.24 |
| 5,737,022 A | 4/1998 | Yamaguchi et al. | |
| 5,764,296 A * | 6/1998 | Shin | 375/240.18 |
| 5,764,374 A | 6/1998 | Seroussi et al. | |
| 5,812,197 A | 9/1998 | Chan et al. | |
| 5,883,976 A | 3/1999 | Ohsawa | |
| 5,974,197 A * | 10/1999 | Lee et al. | 382/268 |
| 6,005,622 A * | 12/1999 | Haskell et al. | 375/240.01 |
| 6,341,144 B1 * | 1/2002 | Haskell et al. | 375/240.2 |

FOREIGN PATENT DOCUMENTS

| | | |
|---|---|---|
| EP | 0 422 404 A2 | 4/1991 |

OTHER PUBLICATIONS

Ploysongsang et al, DCT/DPCM Processing of NTSC Composite Video Signal IEEE Transactions on Communications, vol. Com-30, No. 3, Mar. 1982, USA, p. 541-549.

Cohen et al, "Adaptative Differential Coding of Picture Signals Based on Local Contour Prediction", Communications and Knowledge, Partners in Progress, Nov. 29, 30-Dec. 1, 1976, Dallas, Texas, p. 6.1-1 to 6.1-5.

International Organization for Standardisation; Generic Coding of Moving Pictures and Associated Audio Information: Video; Recommendation H.262; ISO/IEC 13818-2 JTC1/SC29/WG11 N0702(revised) Incorporationg N702 Delta of Mar. 24 and Further Editorial Corrections May 10, 1994.

International Organization for Standardisation; MPEG-4 Video Verification Model Vesion 2.1; ISO/IEC JTC1/SC29/WG11 XXXX of May 3, 1996.

International Organization for Standardisation; Working Draft 4.0 of ISO/IEC 14496-2; ISO/IEC JTC1/SC29/WG11 N1797; MPEG97/Stockholm, Jul. 1997.

"Intra Prediction (T9/T10) and DC/Ac Prediction Results"; International Organisation for Standardisation Coding of Moving Pictures and Associated Audio Information ISO/IEC JTC1/SC29/WG11 MPEG96/0939 Jul. 1996 available in related U.S. Patent No. 6,005,622 issued Dec. 21, 1999.

"Altered Sections of H.263 for Draft Test of H.263+"; ITU—Telecommunications Standardization SectorDocument: ITU-LBC-96-358R1 Study Group 15, can be found in related patent 6,005,622, issued Dec. 21, 1999 available in related U.S. Patent No. 6,005,622 issued Dec. 21, 1999.

"Invited Address: Video Coding Using the MPEG-1 Compression Standard", A. Puri, AT&T Bell Laboratories, Holmdel, New Jersey, 1992 SID International Symposium Digest of Technical Papers, May 1992, Society for Information Display, Playa del Rey, California.

"Video Coding Using the MPEG-2 Compression Standard", A. Puri, AT&T Bel Laboratories, Holmdel, New Jersey, Visual Communications and Image Processing '93, Haskell et al Chairs/Editors, Nov. 8-11, 1993, Cambridge, Massachusetts, pp. 1701-1713, vol. 2094, Part Three, SPIE—The International Society for Optical Engineering, Bellingham, Washington.

"Performance Evaluation of Nonscalable MPEG-2 Video Coding", Schmidt et al, AT&T Bell Laboratories, Holmdel, New Jersey, Visual Communications and Image Processing '94, Aggelos K. Katsaggelos Chair/Editor, Sep. 25-29, 1994, Chicago, Illinois, pp. 296-310, vol. 2308, Part One, SPIE—The International Society for Optical Engineering, Bellingham, Washington.

"Temporal Resolution Scalable Video Coding", Puri et al, AT&T Bell Laboratories, Holmdel, New Jersy, Proceedings, ICIP-94, Nov. 13-16, 1994, Austin, Texas, IEEE Computer Society Press, pp. 947-951, vol. II of III, Los Alamitos, California.

"SBASIC Video Coding and its 3D-DCT Extension for MPEG-4 Multimedia", Puri et al, AT&T Bell Laboratories, Holmdel, New Jersey, Visual Communications and Image Processing '96, Ansari et al Chairs/Editors, Mar. 17-20, 1996, Orlando, Florida, pp. 1331-1341, vol. 2727, Part Three, SPIE—International Society for Optical Engineering, Bellingham, Washington.

International Telecommunication Union, ITU-T Draft H.263, Telecommunication (May 2, 1996), Standardization Sector of ITU, Line Transmission of Non-Telephone Signals, Video Coding for Low Bitrate Communication, Draft ITU-T Recommendation H.263, Contact Person: Karel Rijkse, http://www.image.cityu.edu.hk/~stwkchan/h263/h263.html.

"Status and Direction of the MPEG-4 Standard", Atul Puri, AT&T Bell Laboratories, Holmdel, New Jersey, Multimedia Communications and Video Coding, 1996, Wang et al, Editors, pp. 349-356, Plenum Press, New York.

"Current and Future Trends in Multimedia Standards", Puri, et al, Multimedia Technology for Applications, 1998, Sheu et al, Editors, Chapter 1, pp. 3-35, IEEE Press Marketing, Piscataway, New Jersey.

"Improvements in DCT Based Video Coding", Puri et al, AT&T Laboratories, Visual Communications and Image Processing '97, Feb. 1997, San Jose, California, SPIE—The International Society for Optical Engineering, Bellingham, Washington.

Ploysongsang et al, DCT/DPCM Processing of NTSC Composite Video Signal IEEE Transactions on Communications, vol. Com-30, No. 3, Mar. 1982, USA.

"MPEG-4 Proposal Package Description (PPD)—Revision 2 (Lausanne Revision)"; Source: AOE Sub Group; Organisation Internationale de Normalisation; ISO/IEC JTC1/SC29/WG11 N0937, MPEG 95/ Mar. 1995; Coding of Moving Pictures and Associated Audio Information.

"Description and Results of Coding Efficiency Experiment T9 (part 4) in MPEG-4 Video"; A. Puri, R.L. Schmidt and B.G. Haskell (AT&T); International Organisation for Standardization Organisation Internationale de Normalisation ISO/IEC JTC1/SC29/WG11 MPEG96/1320; Sep. 1996, Chicago; Coding of Moving Pictures and Associated Audio.

"Results of Scalability Experiments"; R.L. Schmidt, A. Puri and B.G. Haskell (AT&T); International Organisation for Standardization Organisation Internationale de Normalisation ISO/IEC JTC1/SC29/WG11, MPEG96/1084; Jul. 1996, Tampere, Finland; Coding of Moving Pictures and Associated Audio.

"Test Model 5", Draft; Source: Test Model Editing Committee; Telecommunication Standardization Sector; Document AVC-491, Version 1; Study Group 15; Experts Group for ATM Video Coding; (Rapporteur's Group on Part of Q.2/15); International Organisation for Standardization Organisation Internationale de Normalisation ISO-IEC/JTC1/SC29/WG11 MPEG93/457; Apr. 1993; Coded Representation of Picture and Audio Information.

"MPEG-4 Video Verification Model Version 5.1" Author: Ad hoc group on MPEG-4 video VM editing; International Organisation for Standardisation Organisation Internationale de Normalisation ISO/IEC JTC1/SC29/WG11, MPEG 96/ XXXX, Dec. 1996; Coding of Moving Pictures and Associated Audio Information.

"Working Draft 1.0 of ISO/IEC 14496-2"; A. Puri (Editor); T. Ebrahimi, J. Ostermann, K. O'Connell, E.S. Jang and the Ad hoc Group on Video Working Draft Editing; International Organization for Standardisation Organisation Internationale de Normalisation ISO/IEC JTC1/SC29/WG11 N1470, MPEG96/ Maceio, Nov. 1996, Coding of Moving Pictures and Audio.

"Information Technology—Generic Coding of Moving Pictures and Associated Audio Information: Video, Recommendation H.262"; ISO/IEC 13818-2; International Organisation for Standardisation Organisation Internationale de Normalisation ISO/IEC JTC1/SG29/WG11, N0702 (revised); Incorporating N702 Delta of Mar. 24 and Further Editorial Corrections; May 10, 1994; Coding of Moving Pictures and Associated Audio.

"Altered Sections of H.263 for Draft Text of H.263+"; Contact: Gary J. Sullivan; ITU—Telecommunications Standardization SectorDocument: ITU-LBC-96-358R1, Study Group 15, LBC Experts Group, Shepperton, UK, Jul. 15-18, 1996.

"Intra Prediction (T9/T10) and DC/AC Prediction Results"; T.K. Tan and S. M. Shen; International Organisation for Normalisation ISO/IEC JTC1/SC29/WG11, MPEG 96/0939; Jul. 1996; Source: Panasonic Singapore Laboratories Pte Ltd (Matsushita); Coding of Moving Pictures and Associated Audio Information.

"Working Draft 4.0 of ISO/IEC 14496-2"; A. Puri (Editor); T. Ebrahimi, C. Horne, J. Ostermann, E.S. Jang and the Ad hoc Groups on Video & SNHC VM/WD Editing; Source: Video & SNHC Groups; International Organization for Standardization Organisation Internationale de Normalisation, ISO/IEC JTC1/SC29/ WG11 N1797, MPEG97/, Stockholm, Jul. 1997; Coding of Moving Pictures and Audio.

"Measurement of Movement and Velocity of Moving Objects with Picture Signals"; IE78-67; T. Fukinuki; pp. 35-41; Central Research Laboratory; Hitachi, Ltd.; Kokubunji, Tokyo, Japan, 185; and English translation.

"Motion-Compensated Interframe Coding for Video Conferencing"; IE81-54; T. Koga et al; pp. 85-90, C&C Systems Research Laboratories; Nippon Electric Co., Ltd; and English translation.

"Motion Correction for Interframe Coding Systems", IE78-6; Y. Nonomiya; pp. 1-10; General Technology Research Institute; Nippon Broadcasting Association; and English translation.

"Video Coding Using the MPEG Compression Standard", A. Puri, AT&T Bell Labs, Holmdel, NJ, Visual Communications and Image Processing '93, Haskell et al Chairs/Editors, Nov. 8-11, 1993, Cambridge, MA, pp. 1701-1713, vol. 2094, Part Three, SPIE—The Int'l. Society for Optical Engineering, Bellingham, WA.

"Performance Evaluation of Nonscalable MPEG-2 Video Coding", Schmidt et al, AT&T Bell Labs, Holmdel, NJ, Visual Communications and Image Processing '94, A.K. Katsaggelos, Chair/Editor, Sep. 25-29, 1994, Chicago, IL, pp. 296-310, vol. 2308, Part One, SPIE—The Int'l. Society for Optical Engineering, Bellingham, WA.

"Temporal Resolution Scalable Video Coding", Puri et al, AT&T Bell Labs, Holmdel, NJ, Proceedings, ICIP-94, Nov. 13-16, 1994, Austin, TX, IEEE Computer Society Press, pp. 947-951, vol. II of III, Los Alamitos, CA.

"SBASIC Video Coding and Its 3D-DCT Extension for MPEG-4 Multimedia", Puri et al, AT&T Bell Labs, Holmdel, NJ, Visual Communications and Image Processing '96, Ansari et al, Chairs/Editors, Mar. 17-20, 1996, Orlando, FL, pp. 1331-1341, vol. 2727, Part Three, SPIE—The Int'l. Society for Optical Engineering, Bellingham, WA2.

Int'l. Telecommunication Union, ITU-T Draft H.263, Telecommunication (May 2, 1996), Standardization Sector of ITU, Line Transmission on Non-Telephone Signals, Video Coding for Low Bitrate Communication, Draft ITU-T Recommendation H.263, Contact Person: Karel Rijkse, http://www.image.cityu.edu.hk/~stwkchan/h263/h263.html.

"Status and Direction of the MPEG-4 Standard", Atul Puri, AT&T Bell Labs, Holmdel, NJ, Multimedia Communications and Video Coding, 1996, Wang et al, Editors, pp. 349-356, Plenum Press, New York.

"Current and Future Trends in Multimedia Standards", Puri et al, Multimedia Technology for Applications, 1998, Sheu et al, Editors, Chapter 1, pp. 3-35, IEEE Press Marketing, Piscataway, NJ.

"Invited address: Video Coding Using the MPEG-1 Compression Standard", A. Puri, AT&T Bell Labs, Holmdel, NJ, 1992 SID Int'l. Symposium Digest of Technical Papers, May 1992, Society for Information Display, Playa de Rey, CA.

Cham et al, "DC Coefficient Restoration in Transform Image Coding", *IEE Proceedings*, vol. 131, Pt. F, No. 7, pp. 709-713, Dec. 1984.

Lee, J.H., et al. "An Efficient Encoding of DCT Blocks with Block-Adaptive Scanning", IEICE Transactions on Communications, Institute of Electronics Information and Comm., Eng. Tokyo, JP. vol. E77-B, No. 12, Dec. 1, 1994, pp. 1489-1494, XP000498064. ISSN: 0916-8516.

N. Meman, et al., "A Comparison of Prediction Schemes Proposed for a a New Lossless Image Compression Standard", (0-7803-3073-0/96), 1996 IEEE pp. 309-312.

Musmann H. G. et al., "Advances in Picture Coding", Proceedings of the IEEE, US, IEEE. New York, vol. 73, No. 4, Apr. 1, 1985, pp. 523-548, XP002057834, ISSN:0018-9219.

* cited by examiner

VIDEO CODER PROVIDING IMPLICIT COEFFICIENT PREDICTION AND SCAN ADAPTATION FOR IMAGE CODING AND INTRA CODING OF VIDEO

RELATED APPLICATIONS

This application is a continuation of Ser. No. 09/942,734, filed Aug. 31, 2001, now U.S. Pat. No. 6,556,625, which is a continuation of 08/908,044, filed Aug. 11, 1997, now U.S. Pat. No. 6,341,144, which application claims the benefit of priority afforded by provisional application No. 60/026,963, filed Sep. 20, 1996, and provisional application No. 60/038,019 filed Feb. 14, 1997, the disclosures of which are incorporated herein by reference.

BACKGROUND OF THE INVENTION

A variety of protocols for communication, storage and retrieval of video images are known. Invariably, the protocols are developed with a particular emphasis on reducing signal bandwidth. With a reduction of signal bandwidth, storage devices are able to store more images and communications systems can send more images at a given communication rate. Reduction in signal bandwidth increases the overall capacity of the system using the signal.

However, bandwidth reduction may be associated with particular disadvantages. For instance, certain known coding systems are lossy, they introduce errors which may affect the perceptual quality of the decoded image. Others may achieve significant bandwidth reduction for certain types of images but may not achieve any bandwidth reduction for others. Accordingly, the selection of coding schemes must be carefully considered.

Accordingly, there is a need in the art for an image coding scheme that reduces signal bandwidth without introducing perceptually significant errors.

SUMMARY OF THE INVENTION

The disadvantages of the prior art are alleviated to a great extent by a predictive coding scheme in which a new block of image data is predicted from three blocks of image data that preceded the new block. For this new block, an encoder examines image data of blocks that are horizontally and vertically adjacent to the new block. The encoder compares the image data of each of the two adjacent blocks to image data of a third block positioned horizontally adjacent to the vertically adjacent block (diagonally above the new block). From these comparisons, a horizontal and a vertical gradient is determined. Based on the values of the gradients, the encoder predicts the image data of the new block to be the image data of the horizontally or vertically adjacent block most similar to it. The encoder then determines a residual difference between the predicted value of the image data and the actual value of the image data for the new block and encodes the residual. A decoder performs an inverse prediction, predicting image data for the new block based upon horizontal and vertical gradients and adding the residual thereto to reconstruct the actual image data of the new block. This process is lossless.

DETAILED DESCRIPTION OF THE PREFERRED EMBODIMENTS

Figure 1A:
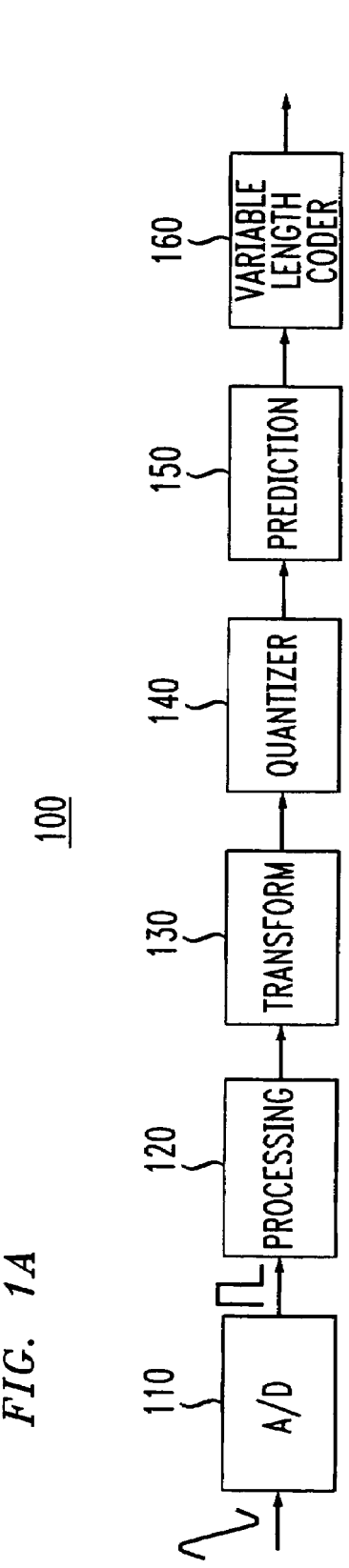
FIG. 1(a) is a schematic drawing of an encoder in accordance with an embodiment of the present invention.
Figure 1B:
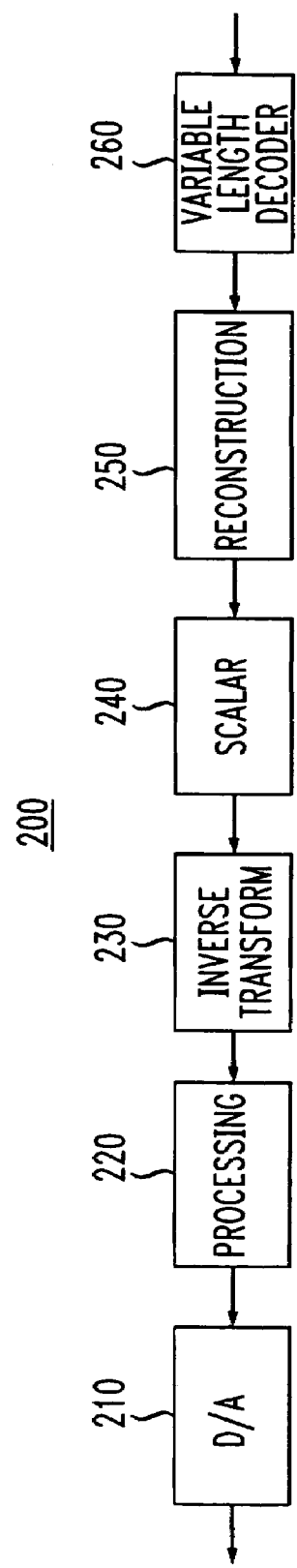
FIG. 1(b) is a schematic drawing of a decoder in accordance with an embodiment of the present invention.

FIG. 1 shows an encoder 100 constructed in accordance with a first embodiment of the present invention. An analog image signal is presented to the encoder 100. The image signal is sampled and converted to a digital signal by an analog to digital ("A/D") converter 110 using techniques known in the art. The A/D converter 110 generates a digital image signal for a plurality of pixels of the image. Alternatively, the image signal may be presented to the encoder as a digital image signal; in this case, the A/D converter 110 is omitted.

The digital image signal is input to a processing circuit 120. The processing circuit 120 may perform a host of functions. Typically, the processing circuit 120 filters the image data and breaks the image data into a luminance signal component and two chrominance signal components. Additionally, the processing circuit 120 groups image data into blocks of data. Where the digital input signal represents information for a plurality of pixels in a scanning direction, the digital output of the processing circuit 120 represents blocks of pixels, for example, data may be blocked into 8 pixel by 8 pixel arrays of image data. The processing circuit 120 outputs image data on a macroblock basis. A macroblock typically consists of four blocks of luminance data and two blocks of chrominance data. The processing circuit 120 may also perform additional functions, such as filtering, to suit individual design criteria.

The output of the processing circuit 120 is input to a transform circuit 130. The transform circuit 130 performs a transformation of the image data, such as discrete cosine transform ("DCT") coding or sub-band coding, from the pixel domain to a domain of coefficients. A block of pixels is transformed to a equivalently sized block of coefficients. Coefficients output by DCT coding generally include a single DC coefficient; the remainder are AC coefficients, some of which are non-zero. Similarly, coefficients output by sub-band coding represent image characteristics at a variety of frequencies; typically, many coefficients from sub-band coding are very small. The transform circuit 130 outputs blocks of coefficients.

A quantizer 140 scales the signals generated by the transform circuit 130 according to a constant or variable scalar value ($Q_p$). The quantizer 140 reduces bandwidth of the image signal by reducing a number of quantization levels available for encoding the signal. The quantization process is lossy. Many small coefficients input to the quantizer 140 are divided down and truncated to zero. The scaled signal is output from the quantizer 140.

The prediction circuit 150 performs gradient prediction analysis to predict scaled DC coefficients of each block. The prediction circuit 150 may pass scaled AC coefficients or, alternatively, may predict AC coefficients of the block. In a preferred mode of operation, the prediction circuit 150 selects between modes of predicting or passing AC coefficients; in this case, the prediction circuit 150 generates an AC prediction flag to identify a mode of operation. The prediction circuit 150 outputs a DC residual signal, AC signals (representing either AC coefficients or AC residuals) and, an AC prediction flag.

A variable length coder 160 encodes the output of the prediction circuit 150. The variable length coder 160 typically is a Huffman encoder that performs run length coding on the scaled signals. A bitstream output from the variable length coder 160 may be transmitted, stored, or put to other uses as are known in the art.

In the encoder 100, the prediction circuit 150 and the quantizer 140 perform functions which are mutually independent. Accordingly, their order of operation is largely immaterial. Although FIG. 1 illustrates output of the quantizer 140 as an input to the prediction circuit 150, the circuits may be reversed in order. The output of the prediction circuit 150 may be input to the quantizer 140.

A decoder 200 performs operations that undo the encoding operation described above. A variable length decoder 260 analyzes the bitstream using a complementary process to recover a scaled signal. If a Huffman encoder were used by the encoder 160, a Huffman decoder 260 is used.

A reconstruction circuit 250 performs the identical gradient analysis performed in the prediction circuit 150. The DC residual signal is identified and added to a predicted coefficient to obtain a DC coefficient. Optionally, the reconstruction circuit 250 may identify the AC prediction flag and, on the status of that flag, interprets the AC information as either AC coefficient information or AC residual information. In the event that AC residual information is present, the reconstruction circuit 250 adds the residual signals to corresponding predicted signals to obtain AC coefficients. The reconstruction circuit 250 outputs coefficient signals.

A scalar circuit 240 multiplies the recovered signal by the same scalar used as a basis for division in the quantizer 140. Of course, those coefficients divided down to zero are not recovered.

An inverse transformation circuit 230 performs the inverse transformation applied by the transform circuit 130 of encoder 100. If a DCT transformation were performed, an inverse DCT transformation is applied. So, too, with sub-band coding. The inverse transformation circuit 230 transforms the coefficient information back to the pixel domain.

A processing circuit 220 combines luminance and chrominance signals and may perform such optional features as are desired in particular application. The processing circuit 220 outputs digital signals of pixels ready to be displayed. At this point the signals are fit for display on a digital monitor. If necessary to fit a particular application, the signals may be converted by a digital to analog converter 210 for display on an analog display.

Figure 2:
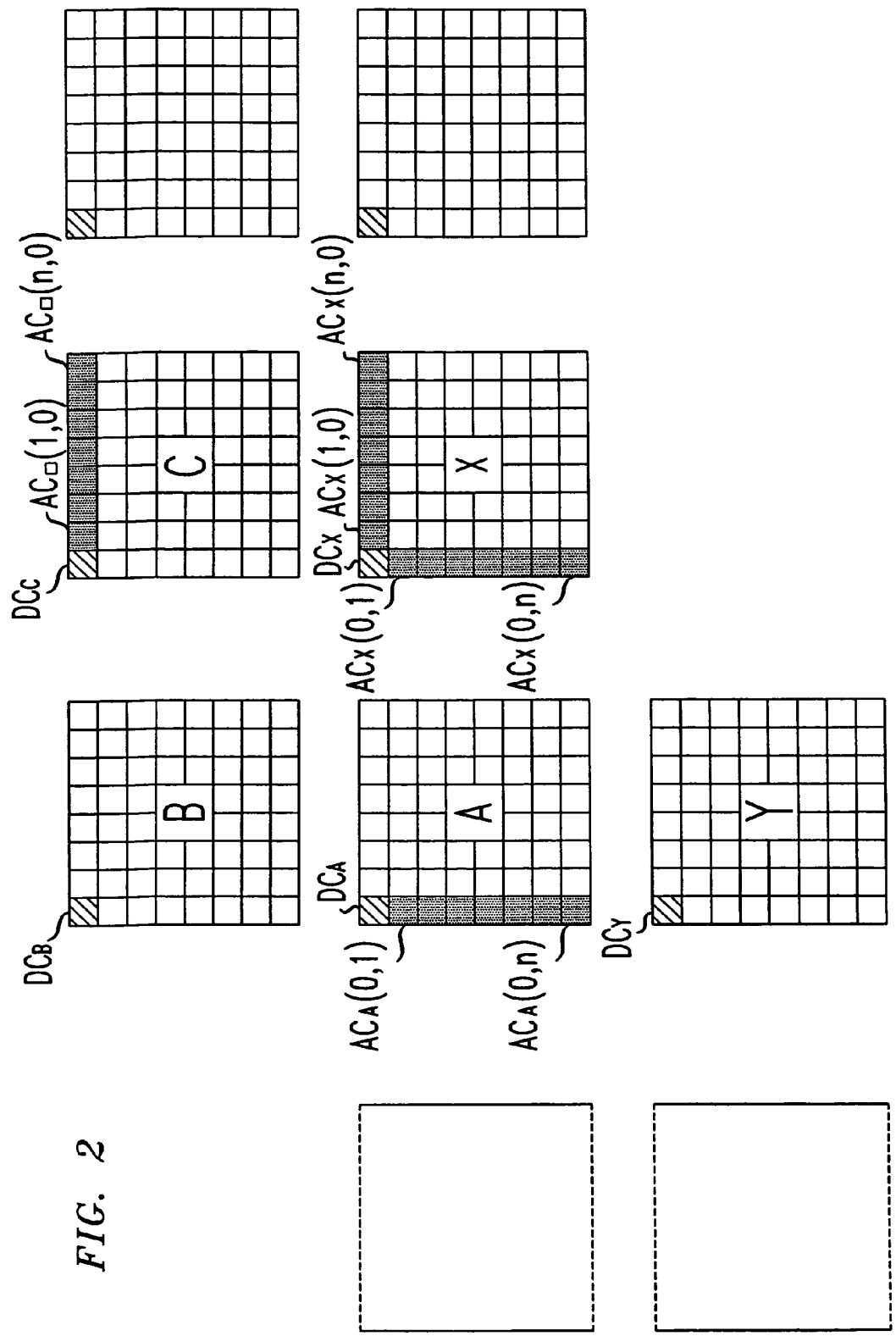
FIG. 2 illustrates an example of image data processed by the present invention.

FIG. 2 illustrates the structure of data as it is processed by the prediction circuit. The data output from the transform circuit represents a plurality of blocks organized into macroblocks. Each macroblock is populated typically by four blocks representing luminance components of the macroblock and two blocks representing chrominance components of the macroblock.

Each block represents coefficients of the spatial area from which the block was derived. When a DCT transform is applied, a DC coefficient of $DC_X$ of the block is provided at the origin of the block, at the upper left corner. AC coefficients are provided throughout the block with the most significant coefficients being provided horizontally on the row occupied by the DC coefficient and vertically on a column occupied by the DC coefficient.

Figure 3:
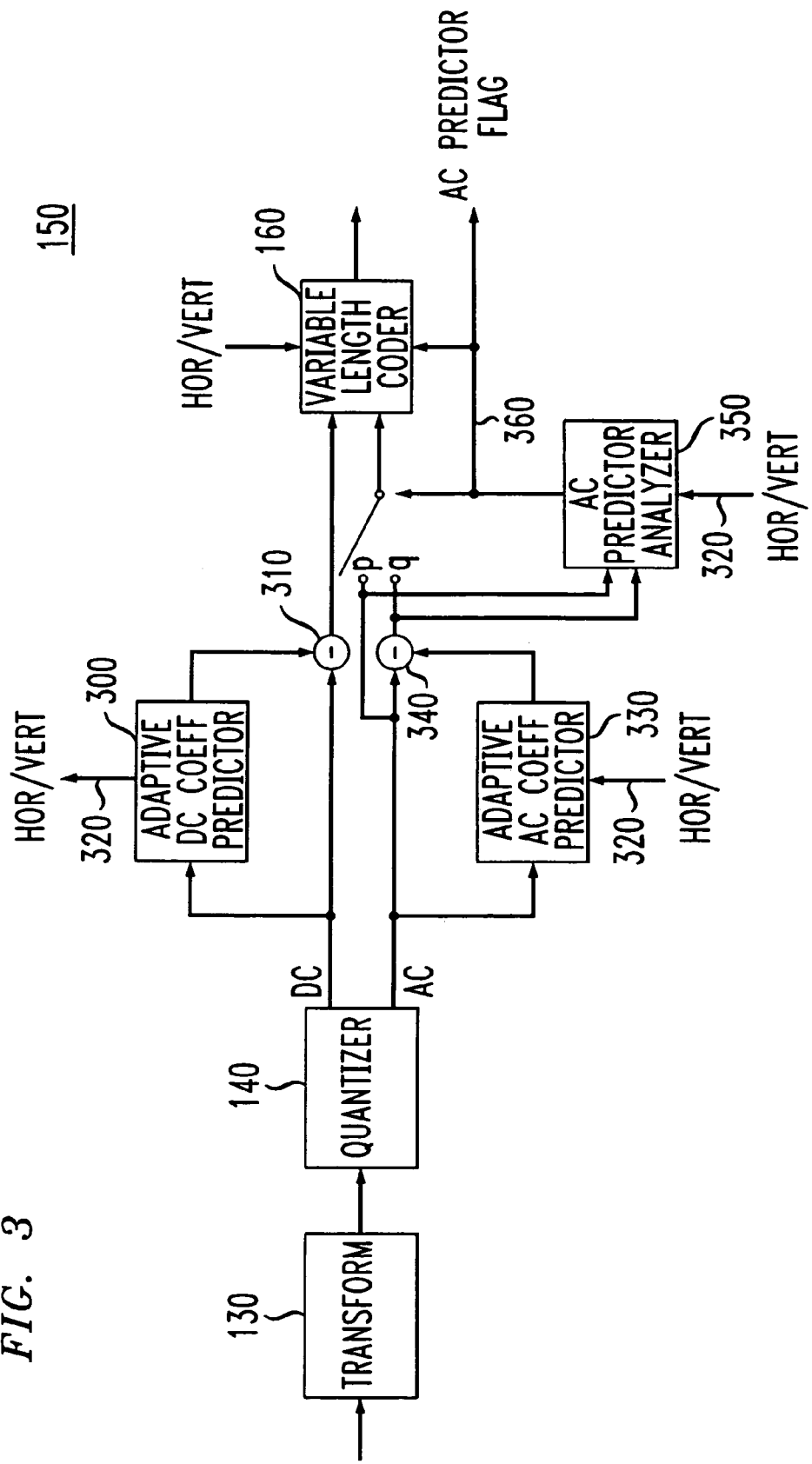
FIG. 3 is a block diagram of the prediction circuit of FIG. 1.

FIG. 3 shows a detailed block diagram of the prediction circuit 150. The quantizer 140 generates scaled DC and AC coefficients. The DC coefficient may be scaled ($DC=DC/Q_p$, typically $Q_p=8$) and is input to a DC coefficient predictor 300. The DC coefficient predictor performs a gradient analysis.

For any block X, the DC coefficient predictor 300 maintains in memory data of a block A horizontally adjacent to block X, block C vertically adjacent to block X and a block B, that is, a block horizontally adjacent to block C and vertically adjacent to block A, shown in FIG. 2. The DC coefficient predictor compares a DC coefficient of block A ($DC_A$) with a DC coefficient of block B ($DC_B$). The difference between the DC coefficients of block A and block B is a vertical gradient. The DC coefficient predictor 300 also compares a DC coefficient of block C ($DC_C$) with the DC coefficient of block B ($DC_B$). The difference between the coefficients of block C and block B is a horizontal gradient.

The block associated with the highest gradient from block B is used as a basis of prediction. If the vertical gradient is greater than the horizontal gradient, it is expected that block A will have high correlation with block X, so the DC coefficient predictor 300 employs horizontal prediction in which it uses block A as a basis for prediction of block X. If the horizontal gradient is greater than the vertical gradient, so the DC coefficient predictor 300 employs vertical prediction in which it uses block C as a basis for prediction of block X. The DC coefficient predictor 300 outputs the DC coefficient of the block used for prediction ($DC_A$ or $DC_C$) to a subtractor 310. The DC coefficient predictor 300 also generates a hor/vert signal 320 indicating whether horizontal prediction or vertical prediction is performed.

The subtractor 310 subtracts the DC coefficient generated by the DC coefficient predictor 300 from the DC coefficient of block X to obtain a DC residual signal for block X. The DC residual may be output from the prediction circuit 150 to the variable length encoder 160.

The process described above is employed to predict coefficients of blocks at the interior of the image to be coded. However, when predicting coefficients at the start of a new row of a video object plane, the previous block for prediction is the last block of the line above under the normal process. Typically, there is little correlation between these blocks.

Assume that block Y in FIG. 2 is at the starting edge of a video object plane. No block is horizontally adjacent to block Y in the scanning direction. Although, image data of a final block in the row above is available to be used as the "horizontally adjacent" block, it is not used for prediction. Instead, the DC coefficient predictor 300 artificially sets the DC coefficient values for a horizontally adjacent block and a block above the horizontally adjacent block to a half strength signal. If the DC coefficients are represented by an 8 bit word, the DC coefficient of these ghost blocks is set to 128. The DC coefficient predictor 300 then performs gradient prediction according to the process described above.

As noted above, the prediction circuit 150 may pass AC coefficients without prediction. However, in a preferred embodiment, the prediction circuit 150 uses the gradient analysis to predict AC coefficients.

When the prediction circuit 150 predicts AC coefficients, only some of the AC coefficients may exhibit high correlation between blocks. In the case of DCT transform coding and horizontal prediction, the only AC coefficients that are likely to exhibit sufficiently high correlation to merit prediction analysis are those in the same column as the DC coefficient (shaded in block A). Accordingly, for each AC coefficient of block X in the same column as the DC coefficient ($AC_X(0,1)$ through $AC_X(0,n)$), an AC coefficient predictor 330 generates a prediction corresponding to the colocated AC coefficient from block A ($AC_A(0,1)$ through $AC_A(0,n)$). The predicted AC coefficient is subtracted from the actual AC coefficient of block X at a subtractor 340 to obtain an AC prediction residual signal.

In the case of DCT transform coding and vertical prediction, the only AC coefficients that are likely to exhibit sufficiently high correlation to merit prediction analysis are those in the same row as the DC coefficient (shaded in block C). For each AC coefficient of block X in the same row as the DC coefficient ($AC_X(1,0)$ through $AC_X(n,0)$), the AC coefficient predictor 330 generates a prediction corresponding to the AC coefficient of block C ($AC_C(1,0)$ through $AC_C(n,0)$). The predicted AC coefficient is subtracted from the actual AC coefficient of block X at the subtractor 340 to obtain an AC prediction residual signal. The AC coefficient predictor is toggled between a horizontal prediction mode and a vertical prediction mode by the hor/vert signal 320. Gradient prediction of AC coefficients other than those described above need not be performed.

While correlation of AC coefficients between blocks may occur, it does not occur always. Accordingly, prediction of AC coefficients does not always lead to bandwidth efficiencies. Accordingly, in a preferred embodiment, the prediction circuit 150 permits selection of modes of operation between a mode wherein AC coefficient prediction is performed and a second mode wherein AC coefficient prediction is not performed. In this latter case, AC coefficients from the transform circuit pass through the prediction circuit without change.

Once the residuals are known, an AC prediction analyzer 350 compares the bandwidth that would be consumed by transmitting the AC residual signals of the macroblock with the bandwidth that would be consumed by transmitting the AC coefficients of the macroblock without prediction. The prediction analyzer 350 selects the transmission mode that consumes relatively less bandwidth. The prediction analyzer 350 generates an AC prediction flag signal 360 to indicate its selection.

Prediction is performed based on "like kind" blocks. When identifying blocks for prediction of a block of luminance data, only adjacent blocks of luminance data are considered. Any intervening blocks of chrominance data are ignored for prediction purposes. When predicting coefficients of the chrominance blocks, only like kind chrominance signals are considered for prediction. When predicting data for a block of $C_r$ data, one type of chrominance signal, adjacent blocks of $C_r$ data are considered but intervening blocks of luminance and second type chrominance signal $C_b$ data are ignored. Similarly, when predicting data for a block of $C_b$ data, a second type of chrominance signal, adjacent blocks of $C_b$ data are considered but intervening blocks of luminance and $C_r$ data are ignored.

The prediction circuit 150 may output a DC residual signal, signals representing either AC coefficients or AC residuals and an AC prediction flag signal.

Figure 4:
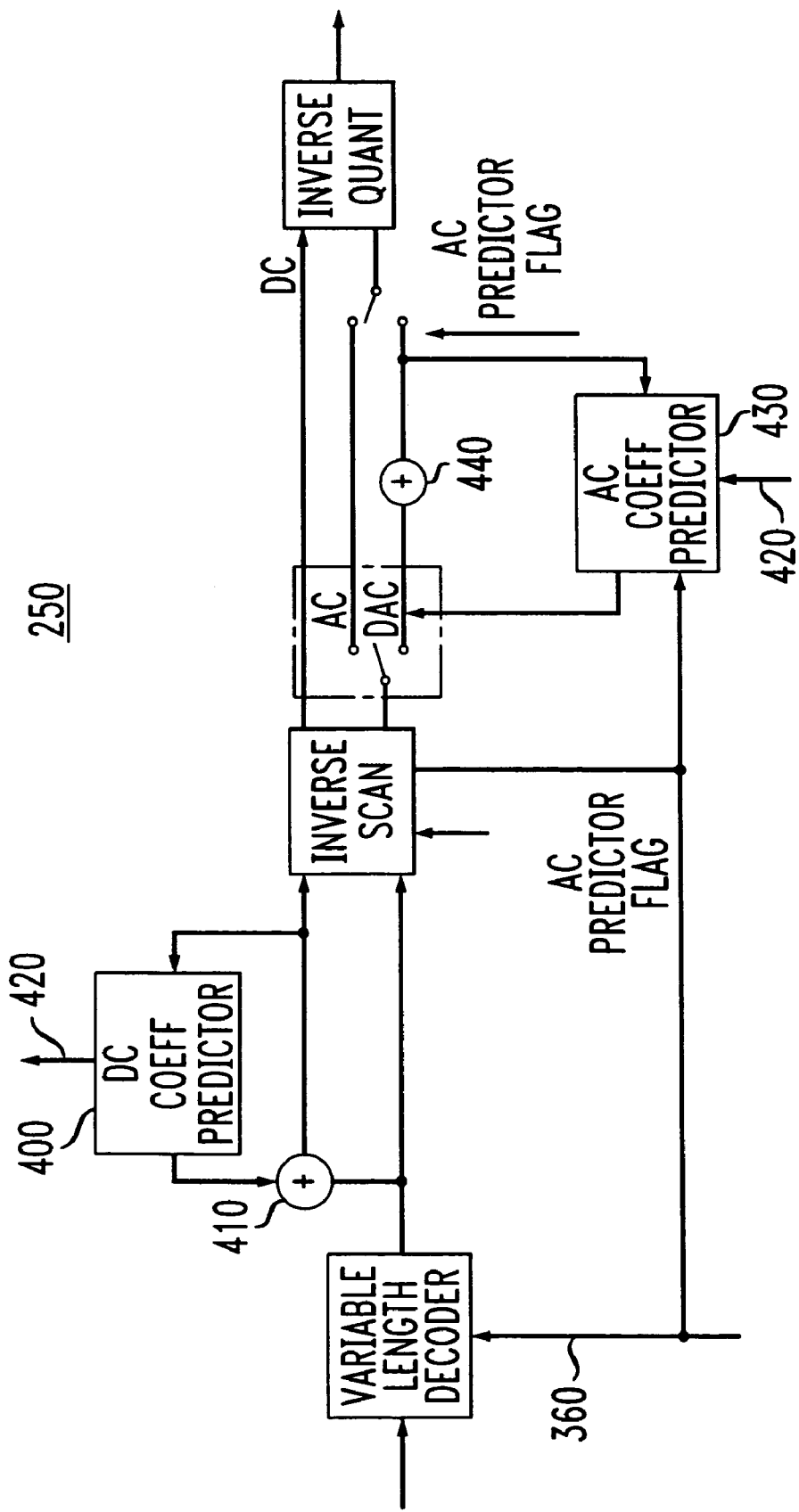
FIG. 4 is a block diagram of the reconstruction circuit of FIG. 1.

An inverse prediction operation is performed in the reconstruction circuit 250, shown in FIG. 4. For every block X, a DC coefficient predictor 400 maintains in memory data of an adjacent block A prior to block X, data of an adjacent block C above block X and data of a block B prior to block C, the block above block X. The DC coefficient predictor 400 compares a DC coefficient of block A with a DC coefficient of block B to determine the vertical gradient. Further, the DC coefficient predictor 400 compares a DC coefficient of block C with the DC coefficient of block B to determine the horizontal gradient. If the horizontal gradient is greater than the vertical gradient, the DC coefficient predictor 400 generates the DC coefficient of block C as a basis for prediction. Otherwise, the DC coefficient predictor 400 generates the DC coefficient of block A. The DC coefficient predictor 400 also generates a hor/vert signal 420 identifying whether horizontal or vertical prediction is used.

The reconstruction circuit 250 identifies the DC residual signal from the input bitstream. An adder 410 adds the DC residual to the DC coefficient generated by the DC coefficient predictor 400. The adder 410 outputs the DC coefficient of block X.

In a preferred embodiment, the reconstruction circuit 250 identifies the AC prediction flag 360 from the input bitstream. If the AC prediction flag 360 indicates that AC prediction was used, the reconstruction circuit identifies the AC residual signals from the input bitstream and engages an AC coefficient predictor 430. A hor/vert signal 420 from the DC coefficient predictor identified whether block A or block C is used as a basis for prediction. In response, the AC coefficient predictor 430 generates signals corresponding to the AC coefficients of block A or block C in the same manner as the AC coefficient predictor 330 of the predictor 140. An adder 440 adds predicted AC coefficients to corresponding residuals and outputs reconstructed AC coefficients.

If the AC prediction flag indicates that AC prediction was not used, the reconstruction circuit 250 identifies the AC coefficient signals from the bitstream. No arithmetic operations are necessary to reconstruct the AC coefficients.

Refinements of the DC prediction may be achieved in a preferred embodiment by inducing contribution of some of the perceptually significant AC coefficients from the block of prediction to the DC coefficient of block X. For example, where block A is used as a basis of prediction, the predicted DC coefficient of block X may be set as:

$$DC_X = DC_A + (4Q_p/3)*(AC_{02A} - AC_{01A}/4)$$

where $Q_p$ is the scaling factor of the quantities and $AC_{02A}$ and $AC_{01A}$ are AC coefficients of block A generated by a DCT transform.

Similarly, when block C is used as a basis for prediction, the predicted DC coefficient of block X may be set as:

$$DC_X = DC_C + (4Q_p/3)*(AC_{20C} - AC_{10C}/4)$$

where $Q_p$ is the scaling factor of the quantities and $AC_{20C}$ and $AC_{10C}$ are AC coefficients of block C generated by a DCT transform.

The prediction and reconstruction process described herein is termed an "implicit" method because no overhead signals are required to identify which of the blocks are used for prediction. In operation, coefficient values of blocks A, B and C are known at both the encoder 100 and the decoder 200. Thus, the decoder 200 can reconstruct the prediction operation of the encoder 100 without additional signaling. In an embodiment where the prediction circuit did not select between modes of AC prediction, the AC prediction and reconstruction is purely implicit. With the addition of an AC prediction flag in a second embodiment, the prediction process is no longer purely implicit.

The encoding/decoding operation of the prediction and reconstruction circuit may also be performed in software by a programmed micro processor or digital signal processor.

Figure 5:
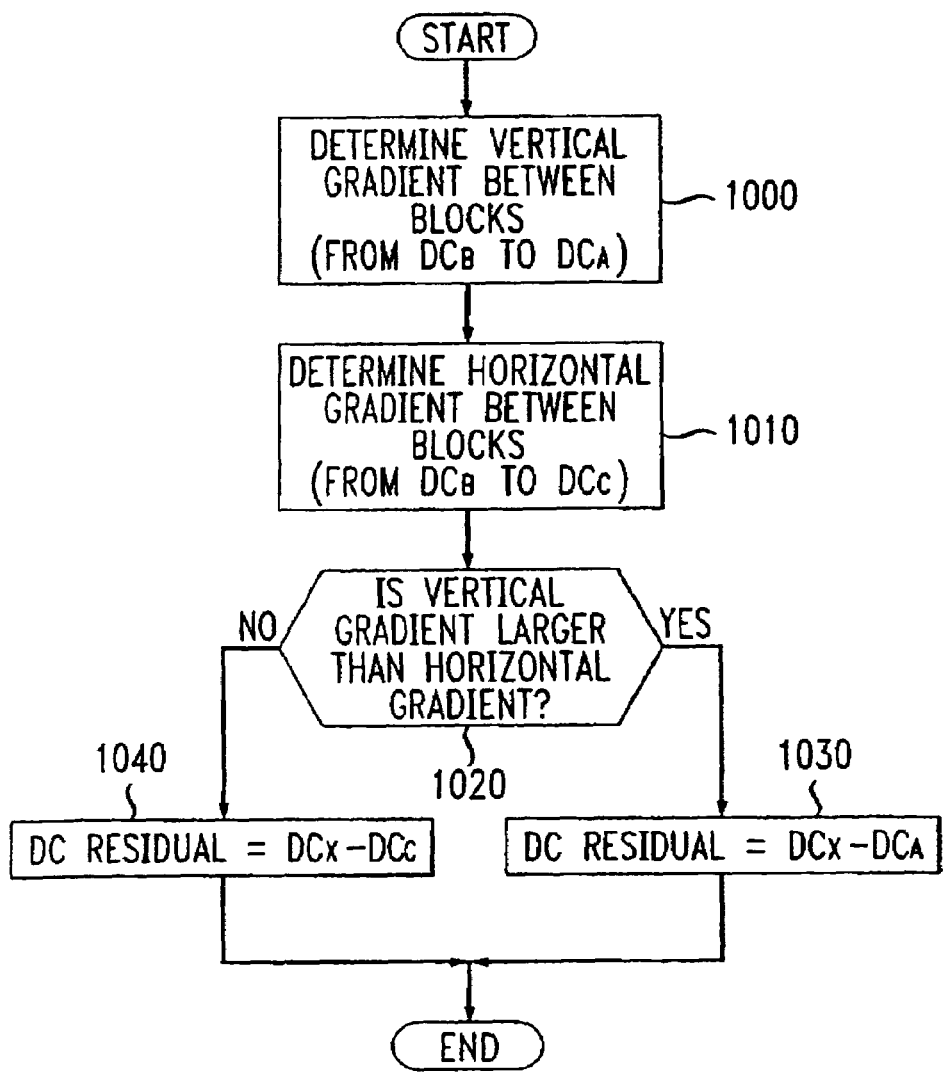
FIG. 5 is a flow diagram of a prediction circuit implemented in software.

FIG. 5 illustrates the operation of the software implemented prediction circuit. The processor compares the DC coefficient of block A to the DC coefficient of block B to determine the vertical gradient (Step 1000). The processor also compares the DC coefficient of block C to the DC coefficient of block B to determine the horizontal gradient (Step 1010).

The processor determines whether the vertical gradient is larger than the horizontal gradient. (Step 1020). If so, the processor defines the DC residual of block X to be the actual DC coefficient of block X less the DC coefficient of block A (Step 1030). If not, the processor defines the DC residual of block X to be the actual DC coefficient of block X less the DC coefficient of block C (Step 1040).

Figure 6:
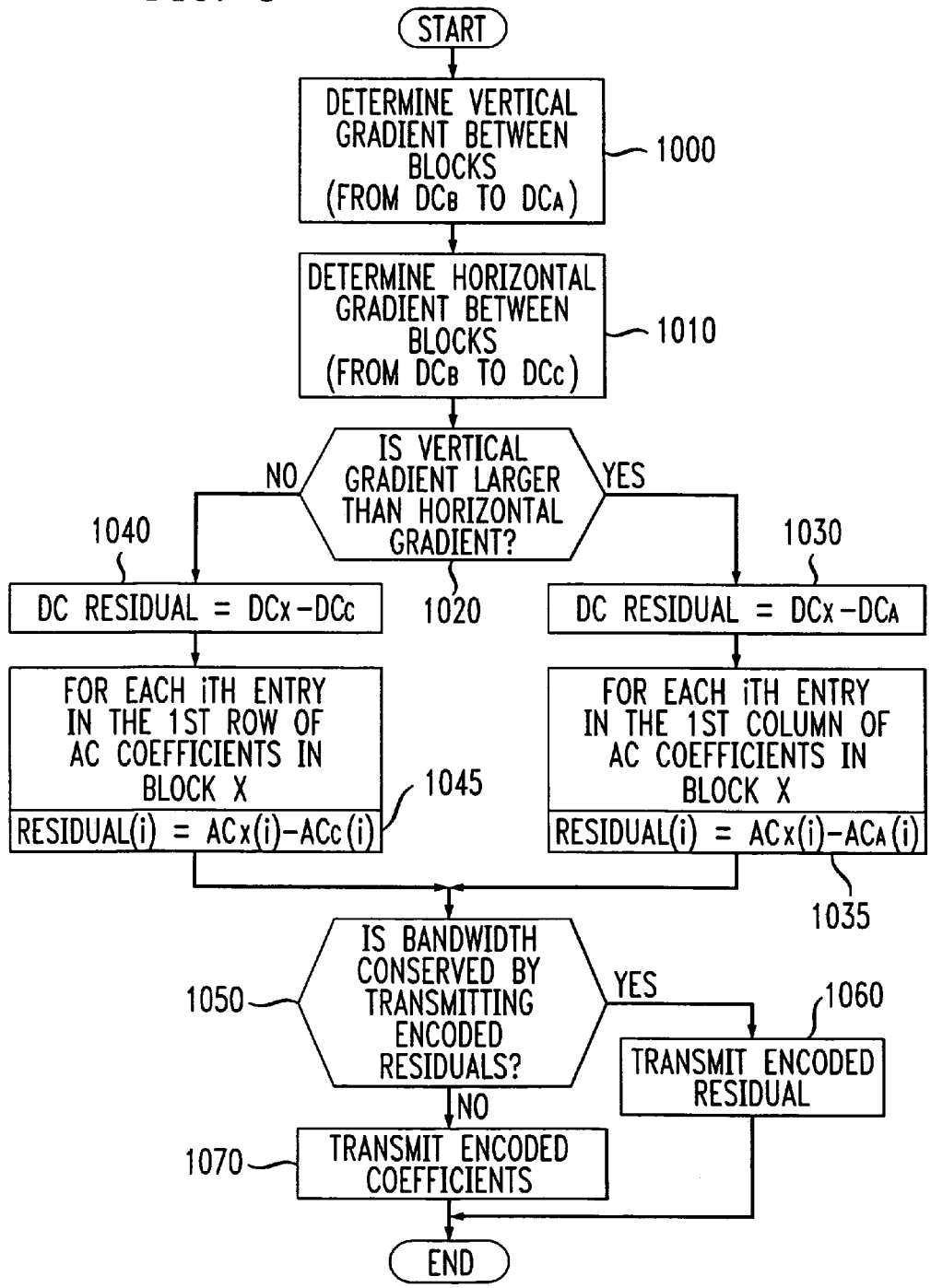
FIG. 6 is a flow diagram of a second embodiment of a prediction circuit implemented in software.

In the event the processor also performs AC prediction, the processor operates as shown in FIG. 6. Steps 1000–1040 occur as discussed above with respect to FIG. 5. When the vertical gradient is larger than the horizontal gradient, the AC coefficients from block A that are in the same column as the DC coefficient are used as a basis for predicting the corresponding AC coefficients of block X. Accordingly, for each such AC coefficient $AC_X(0,1)$ through $AC_X(0,n)$, block X, the processor computes an AC residual set to the actual AC coefficient in block X less the corresponding AC coefficient in block A ($AC_A(0,1)$ through $AC_A(0,n)$) (Step 1035).

When block C is used as a basis of prediction, the AC coefficients in the same row of the DC coefficients may exhibit correlation between blocks. Accordingly, for each AC coefficient AC(i) in the row of block X, the processor computes a residual (i) set to the actual AC coefficient in block X less the corresponding AC coefficient in block C (Step 1045).

The processor also determines whether bandwidth savings are achieved by predicting the AC coefficients. Once all prediction is done for a macroblock, the processor determines whether less bandwidth is occupied by the encoded coefficients or the residuals (Step 1050). If the residuals occupy less bandwidth, the processor outputs the residuals (Step 1060). Otherwise, the processor outputs the coefficients (Step 1070).

Additional bandwidth efficiencies are obtained, in a preferred embodiment, by tying a scan direction of the variable length coder 160 to the gradient prediction. The encoder scans blocks of coefficients to generate run-level events that are VLC coded. In natural images, however, a predominant preferred scan direction often exists. The present invention uses the gradient prediction analysis to select one of three scan directions to perform run length coding.

TABLE 1

Alternate Horizontal

| 0 | 1 | 2 | 3 | 8 | 9 | 10 | 11 |
|---|---|---|---|---|---|---|---|
| 4 | 5 | 6 | 7 | 16 | 17 | 18 | 19 |
| 12 | 13 | 14 | 15 | 24 | 25 | 26 | 27 |
| 20 | 21 | 22 | 23 | 32 | 33 | 34 | 35 |
| 28 | 29 | 30 | 31 | 40 | 41 | 42 | 43 |
| 36 | 37 | 38 | 39 | 48 | 49 | 50 | 51 |
| 44 | 45 | 46 | 47 | 56 | 57 | 58 | 59 |
| 52 | 53 | 54 | 55 | 60 | 61 | 62 | 63 |

TABLE 2

Alternate Vertical

| 0 | 4 | 12 | 20 | 28 | 36 | 44 | 52 |
|---|---|---|---|---|---|---|---|
| 1 | 5 | 13 | 21 | 29 | 37 | 45 | 53 |
| 2 | 6 | 14 | 22 | 30 | 38 | 46 | 54 |
| 3 | 7 | 15 | 23 | 31 | 39 | 47 | 55 |
| 8 | 16 | 24 | 32 | 40 | 48 | 56 | 60 |
| 9 | 17 | 25 | 33 | 41 | 49 | 57 | 61 |
| 10 | 18 | 26 | 34 | 42 | 50 | 58 | 62 |
| 11 | 19 | 27 | 35 | 43 | 51 | 59 | 63 |

The first of the scan directions is a alternate horizontal scan, shown in Table 1 above. The alternate horizontal search is employed when the preferred direction of scan is in the horizontal direction. The scan starts from the origin, the position of the DC residual of the block. From the origin, the scan traverses three positions in a horizontal direction (0–3). From the fourth position, the scan jumps down to the first position of the second row. From the first position of the second row, the scan traverses three positions in the horizontal direction. The scan then jumps back to the first row of the block and traverses the remainder of the row. At the conclusion of the first row, the scan jumps to the third row.

The alternate horizontal scan traverses the next five passes (rows 3–8) in an identical manner. From the first position in the $i^{th}$ row, the scan traverses three positions in a horizontal scan direction. The scan then jumps to the (i-1) row and scans from the fifth position to the end of the row. At the conclusion of the fifth pass, the scan jumps to the fifth position of the eighth row and traverses to the end of that row.

The second of the scan directions is an alternate vertical scan shown in Table 2. The alternate vertical search is employed when the preferred direction of scan is in the vertical direction. The alternate vertical scan is a complimentary process to the alternate horizontal scan.

From the origin, the scan traverses three positions in a vertical direction (0–3). From the fourth position, the scan jumps to the first position of the second column. From the first position of the second column, the scan traverses three positions in the vertical direction. The scan then jumps back to the first column of the block and traverses the remainder of the column. At the conclusion of the first column, the scan jumps to the third row.

The alternate vertical scan traverses the next five passes (columns 3–8) in an identical manner. From the first position in the $i^{th}$ row, the scan traverses three positions in the vertical scan direction. The scan then jumps to the (i-1) column and scans from the fifth position to the end of the column. At the conclusion of the fifth pass, the scan jumps to the fifth position of the eighth column and traverses to the end of the column.

The third scan direction is a traditional zig-zag scan that is well known in the art.

The variable length encoder 160 chooses a scan type according to the type of AC prediction performed. If the AC prediction flag 360 indicates that no AC prediction is performed, the variable length encoder 160 performs the traditional zig zag scan. If the AC prediction flag indicates that AC prediction is performed, the variable length encoder 160 looks to the hor/vert signal 320 to determine whether horizontal prediction or vertical prediction is used. In the case of horizontal prediction the vertical-diagonal scan is employed. If vertical prediction is used, the variable length encoder 160 employs horizontal-diagonal scan.

No additional overhead is required to determine the direction of scan. The variable length decoder 260 determines the direction of scan. The AC prediction flag 360 and the hort/vert signal 420 output from reconstruction circuit 250. If the AC prediction flag 360 indicates that AC prediction was not performed, the variable length decoder 260 assembles coefficients according to a zig-zag pattern. If the AC prediction flag 360 indicates that AC prediction was performed, the variable length decoder 260 assembles residuals based on the gradient prediction. Residuals are assembled according to the vertical-diagonal scan in the case of horizontal prediction or by the horizontal-diagonal scan in the case of vertical prediction.

In another embodiment, the alternate horizontal and alternate vertical scans may progress as shown respectively in the following Tables 3 and 4:

TABLE 3

Alternate Horizontal

| 0 | 1 | 2 | 3 | 4 | 9 | 10 | 11 |
|---|---|---|---|---|---|----|----|
| 5 | 6 | 7 | 8 | 16 | 17 | 18 | 19 |
| 12 | 13 | 14 | 15 | 24 | 25 | 26 | 27 |
| 20 | 21 | 22 | 23 | 32 | 33 | 34 | 35 |
| 28 | 29 | 30 | 31 | 40 | 41 | 42 | 43 |
| 36 | 37 | 38 | 39 | 48 | 49 | 50 | 51 |
| 44 | 45 | 46 | 47 | 56 | 57 | 58 | 59 |
| 52 | 53 | 54 | 55 | 60 | 61 | 62 | 63 |

TABLE 4

Alternate Vertical

| 0 | 5 | 12 | 20 | 28 | 36 | 44 | 52 |
|---|---|----|----|----|----|----|----|
| 1 | 6 | 13 | 21 | 29 | 37 | 46 | 53 |
| 2 | 7 | 14 | 22 | 30 | 38 | 46 | 54 |
| 3 | 8 | 15 | 23 | 31 | 39 | 47 | 55 |
| 4 | 16 | 24 | 32 | 40 | 48 | 56 | 60 |
| 9 | 17 | 25 | 33 | 41 | 49 | 57 | 61 |
| 10 | 18 | 26 | 32 | 42 | 50 | 58 | 62 |
| 11 | 19 | 27 | 35 | 43 | 51 | 59 | 63 |

In a further embodiment, the alternate horizontal and alternate vertical scans may progress as shown respectively in tables 5 and 6 below:

TABLE 5

Alternate Horizontal

| 0 | 1 | 2 | 3 | 10 | 11 | 12 | 13 |
|---|---|---|---|----|----|----|----|
| 4 | 5 | 8 | 9 | 17 | 16 | 15 | 14 |
| 6 | 7 | 19 | 18 | 26 | 27 | 28 | 29 |
| 20 | 21 | 24 | 25 | 30 | 31 | 32 | 33 |
| 22 | 23 | 34 | 35 | 42 | 43 | 44 | 45 |
| 36 | 37 | 40 | 41 | 46 | 47 | 48 | 49 |
| 38 | 39 | 50 | 51 | 56 | 57 | 58 | 59 |
| 52 | 53 | 54 | 55 | 60 | 61 | 62 | 63 |

TABLE 6

Alternate Vertical

| 0 | 4 | 6 | 20 | 22 | 36 | 38 | 52 |
|---|---|---|----|----|----|----|----|
| 1 | 5 | 7 | 21 | 23 | 37 | 39 | 53 |
| 2 | 8 | 19 | 24 | 34 | 40 | 50 | 54 |
| 3 | 9 | 18 | 25 | 35 | 41 | 51 | 55 |
| 10 | 17 | 26 | 30 | 42 | 46 | 56 | 60 |
| 11 | 16 | 27 | 31 | 43 | 47 | 57 | 61 |
| 12 | 15 | 28 | 32 | 44 | 48 | 58 | 62 |
| 13 | 14 | 29 | 33 | 45 | 49 | 59 | 63 |

The alternate horizontal scan of table 5 begins at an origin, the position of the DC residual of the block (position 0). From the origin, the scan steps three places in the horizontal direction (positions 0 to 3). The scan jumps to first position of the second column, below the origin (position 4). From position 4, the alternate horizontal scan steps one step in the horizontal direction (position 5), then jumps to the first position of the third row (position 6). The scan steps one position in the horizontal direction (position 7), returns to the second row at the third position (position 8) and steps across the row one position (position 9).

From position 9, the alternate horizontal scan returns to the first row at the fifth position (position 10). The scan steps across to the end of the first row (positions 11 to 13). The scan returns to the second row at the end of the row (position 14) and scans horizontally across the row toward the interior until the second row is completed (positions 15 to 17). From position 17, the alternate horizontal scan returns to the third row at the fourth position (position 18), scans one step horizontally toward the origin (position 19) and jumps to the first position of the fourth row (position 20).

From the first position of the fourth row, the alternate horizontal scan steps horizontally one position (position 21), then jumps to the first position of the fifth row (position 22) and steps horizontally one position again (position 23). The scan returns to the fourth row at the third position (position 24), scans across one step (position 25) then returns to the third row at the fifth position (position 26). The scan steps horizontally across the third row to complete the row (positions 27 to 29).

From the end of the third row, the alternate horizontal scan returns to the fourth row at the fifth position (position 30). The scan steps horizontally across the fourth row to complete the row (positions 31 to 33).

From the end of the fourth row, the alternate horizontal scan returns to the fifth row at the third position (position 34). The scan steps one position in the horizontal direction (position 35), then jumps to the first position of the sixth row (position 36). The scan steps across one position (position 37), the jumps to the first position of the seventh row (position 38). The alternate horizontal scan steps across one position (position 39), then returns to the sixth row at the third position (position 40). The scan steps one position across (position 41) then returns to the fifth row at the fifth position (position 42). The alternate horizontal scan steps horizontally across the fifth row to complete the row (positions 43 to 45).

From the end of the fifth row, the alternate horizontal scan returns to the sixth row at the fifth position (position 46) and steps horizontally across to complete the row (position 47 to 49).

From the end of the sixth row, the alternate horizontal scan returns to the third position of the seventh row (position 50). The scan steps horizontally one position (position 51), then jumps to the first position of the eighth row (position 52). The scan steps horizontally three positions (positions 53 to 55), then returns to the seventh row at the fifth position (position 56). The alternate horizontal scan steps horizontally across to complete the row (position 57 to 59). From the end of the seventh row, the scan jumps to the fifth position of the eighth row (position 60) and steps horizontally across complete the row (positions 61 to 63).

The alternate vertical scan of table 6 begins at an origin, the position of the DC residual of the block (position 0). From the origin, the scan steps three places in the vertical direction (positions 0 to 3). The scan jumps to the first position of the second column, across from the origin (position 4). From position 4, the alternate vertical scan steps one step in the vertical direction (position 5), then jumps to the first position of the third column (position 6). The scan steps one position in the vertical direction (position 7), then returns to the second column at the third position (position 8) and steps one position in the vertical direction (position 9).

From position 9, the alternate vertical scan returns to the first column at the fifth position (position 10). The scan steps through to the end of the first column (positions 11 to 13) The scan returns to the second column at the end of the column (position 14) and scans vertically through the column toward the interior of the column until the second column is completed (positions 15 to 17). From position 17, the alternate vertical scan returns to the third column the fourth position (position 18), scans one step vertically toward the top of the column (position 19) and jumps to the first position of the fourth column (position 20).

From the first position in the fourth column, the alternate vertical scan steps vertically one position (position 21), then jumps to the first position in the fifth column (position 22) and steps vertically one position again (position 23). The scan returns to the fourth column at the third position (position 24), scans one step in the vertical direction (position 25), then returns to the third column at the fifth position (position 26). The scan steps vertically through the third column to complete the column (positions 27 to 29).

From the end of the third column, the alternate vertical scan returns to the fourth column at the fifth position (position 30). The scan steps vertically through the fourth column to complete the column (positions 31 to 33).

From the end of the fourth column, the alternate vertical scan returns to the fifth column at the third position (position 34). The scan steps one position in the vertical direction (position 35), then jumps to the first position of the sixth column (position 36). The scan steps one position vertically (position 37), the jumps to the first position of the seventh column (position 38). The alternate vertical scan steps one position vertically (position 39), then returns to the sixth column at the third position (position 40). The scan steps one position vertically (position 41) then returns to the fifth position of the fifth column (position 42) and steps vertically across the fifth column to complete the column (positions 43 to 45).

From the end of the fifth column, the alternate vertical scan returns to the fifth position of the sixth column (position 46) and steps vertically across the sixth column to complete the column (positions 47 to 49).

From the end of the sixth column, the alternate vertical scan returns to the third position of the seventh column (position 50). The scan steps vertically one position (position 51), then jumps to the first position of the eighth column (position 52). The scan steps vertically three positions (positions 53 to 55), then returns to the fifth position of the seventh column (position 56). The scan steps vertically through the seventh column to complete the column (positions 57 to 59). From the end of the seventh column, the alternate vertical scan jumps to the fifth position of the eighth column (position 60) and steps vertically through the eighth column to complete the column (positions 61 to 63).

According to the present invention, video coding of coefficient data may be made more efficient by an implicit gradient prediction method and by a scanning technique that exploits results obtained by the gradient prediction method. At the time of this writing, the coding scheme of the present invention is adopted into the MPEG-4 Video Verification Model and is being considered for the MPEG-4 video standard.

We claim:

1. A coding method, comprising:
organizing image data into an array of blocks;
transforming data of each block according to a discrete cosine transform, resulting in at least one DC coefficient and at least one AC coefficient for the respective block;
for each block X in the image data:
  determining a first gradient of DC coefficients between a block B above and to the left of block X and a block A immediately to the left of block X;
  determining a second gradient of DC coefficients between the block B and a block C immediately above block X;
  when the first gradient is less than the second gradient, predicting a DC coefficient of block X to be the value of the DC coefficient of block C;
  otherwise, predicting the DC coefficient of block X to be the value of the DC coefficient of block A; and
  generating a residual DC coefficient for the block X from the predicted DC coefficient and the DC coefficient for block X; and
variable length coding coefficients for each block using the residual DC coefficient of each block in place of the at least one DC coefficient for each respective block, wherein, when any block A, B, C is outside a boundary of the image data, the block's DC coefficient is taken to be a predetermined value.

2. The coding method of claim 1, wherein a direction of the variable length coding for each block X changes depending on whether the first gradient is greater than or less than the second gradient.

3. The coding method of claim 1, further comprising, when the DC coefficient of a block X is taken from block A:
predicting a column of AC coefficients in block X co-located with the DC coefficient from a corresponding column of AC coefficients in block A;
generating residual AC coefficients from the predicted column of AC coefficients and the AC coefficients for block A, wherein the variable length coding of block X further uses the residual AC coefficients in place of the AC coefficients for block X.

4. The coding method of claim 3, further comprising:
determining whether a variable length coding of the AC coefficients for block X consumes less bandwidth than the variable length coding of the residual AC coefficients for block X; and
if so, outputting the variable length coding of block X with the AC coefficients for block X.

5. The coding method of claim 3, further comprising outputting a flag signal that indicates whether the variable length coded coefficients include residual AC coefficients.

6. The coding method of claim 3, wherein a direction of the variable length coding is given by Table 2.

7. The coding method of claim 3, wherein a direction of the variable length coding is given by Table 4.

8. The coding method of claim 3, wherein, a direction of the variable length coding is given by Table 6.

9. The coding method of claim 1, further comprising, when the DC coefficient of a block X is taken from block C:
predicting a row of AC coefficients in block X co-located with the DC coefficient from a corresponding row of AC coefficients in block C; and
generating residual AC coefficients from the predicted AC coefficients and AC coefficients for block C, wherein the variable length coding of block X further uses the residual AC coefficients in place of AC coefficients for block X.

10. The coding method of claim 9, further comprising:
determining whether a variable length coding of AC coefficients for block X consumes less bandwidth than variable length coding of residual AC coefficients for block X; and
if so, outputting the variable length coding of block X with the AC coefficients for block X.

11. The coding method of claim 10, further comprising outputting a flag signal that indicates whether the output variable length coding of block X with the AC coefficients for block X include residual AC coefficients.

12. The coding method of claim 9, wherein a direction of the variable length coding is given by Table 1.

13. The coding method of claim 9, wherein a direction of the variable length coding is given by Table 3.

14. The coding method of claim 9, wherein a direction of the variable length coding is given by Table 5.

15. A decoding method, comprising:
identifying each of a plurality of blocks of coded image data;
variable length decoding coded data of each block, resulting in a DC coefficient and at least one AC coefficient for each block;
for each block X in the image data:
determining a first gradient of DC coefficients between a previously-decoded block B above and to the left of block X and a previously-decoded block A immediately to the left of block X;
determining a second gradient of DC coefficients between the block B and a previously-decoded block C immediately above block X;
when the first gradient is less than the second gradient, predicting a DC coefficient of block X to be the value of the DC coefficient of block C, otherwise, predicting the DC coefficient of block X to be the value of the DC coefficient of block A;
generating a DC coefficient for block X from a decoded DC coefficient for block X and the predicted DC coefficient for block X; and
generating image data of each black according to an inverse discrete cosine transform using the generated DC coefficient in place of the decoded DC coefficient for the block, wherein; a DC coefficient for any block A, B or C outside the image data boundary is taken to be a predetermined value.

16. The decoding method of claim 15, wherein a scan direction of the variable length decoding for each block X changes depending on whether the first gradient is greater than or less than the second gradient.

17. The decoding method of claim 15, wherein, when the first gradient is less than the second gradient, a direction of the variable length coding is given by Table 1.

18. The decoding method of claim 15, wherein, when the first gradient is greater than the second gradient, a direction of the variable length coding is given by Table 2.

19. The decoding method of claim 15, wherein, when the first gradient is less than the second gradient, a direction of the variable length coding is given by Table 3.

20. The decoding method of claim 15, wherein, when the first gradient is greater than the second gradient, a direction of the variable length coding is given by Table 4.

21. The decoding method of claim 15, wherein, when the first gradient is less than the second gradient, a direction of the variable length coding is given by Table 5.

22. The decoding method of claim 15, wherein, when the first gradient is greater than the second gradient, a direction of the variable length coding is given by Table 6.

23. The decoding method of claim 15, further comprising:
determining if a block X of coded image data includes a flag indicating that the coded image data includes residuals associated with predicted AC coefficients;
if so, and if the predicted DC coefficient of block X was taken from block A, then predicting a column of AC coefficients in block X co-located with the DC coefficient from a corresponding column of AC coefficients in block A; and
generating decoded AC coefficients of block X in the column from the predicted AC coefficients and a corresponding column of AC coefficients, wherein the inverse discrete cosine transform also uses the generated decoded AC coefficients in place of the AC coefficients for block X.

24. The decoding method of claim 15, further comprising:
determining if a block X of coded image data includes a flag indicating that the coded image data includes residuals associated with predicted AC coefficients;
if so, and if the predicted DC coefficient of block X was taken from block C, then predicting a row of AC coefficients in block X co-located with the DC coefficient from a corresponding row of AC coefficients in block C; and
generating decoded AC coefficients of block X in the row from the predicted AC coefficients and a corresponding row of AC coefficients, wherein the inverse discrete cosine transform also uses the generated decoded AC coefficients in place of AC coefficients for block X.

25. In a predictive video coder, a method of selecting a prediction direction for a block X of video data to be decoded based on data $DC_A$ for a block A to the left of the block X, data $DC_B$ for a block B to the above-left of the block X and data $DC_C$ for a block C above block X, comprising:
if $|DC_A-DC_B|<|DC_B-DC_C|$, predicting from block C,
otherwise, predicting from block A, wherein data $DC_N$ of each block N are DC values of a discrete cosine transform, where N represents the respective block A, B or C.

26. The method of claim 25, wherein the blocks A, B and C are the nearest neighbors to block X in their respective directions.

27. The method of claim 25, further comprising, when prediction occurs from block C, variable length coding coefficients of the block X according to a scan direction identified in Table 5.

28. The method of claim 25, further comprising, when prediction occurs from block A, variable length coding coefficients of the block X according to a scan direction identified in Table 6.

29. The method of claim 25, further comprising, variable length coding coefficients of the block X according to a zig-zag scan when an AC prediction flag indicates that AC prediction was not used.

30. The method of claim 25, further comprising, when predicting from block C, predicting a row of AC coefficients in block X from co-located AC coefficients in block C.

31. The method of claim 30, wherein the predicted a row of AC coefficients are the only AC coefficients so predicted in block X.

32. The method of claim 25, further comprising, when predicting from block A, predicting a column of AC coefficients in block X from co-located AC coefficients in block A.

33. The method of claim 32, wherein the predicted a column of AC coefficients are the only AC coefficients so predicted in block X.

34. A video decoder, comprising:
a variable length decoder, having an input for coded video data and an output for coefficient data of a plurality of blocks;
a gradient analyzer having an input coupled to the output of the variable length decoder and an output for predicted coefficient data of the blocks, the gradient analyzer to predict an inverse quantized DC coefficient of a block X from block C immediately above block X if $|DC_A-DC_N|<|DC_B-DC_C|$ and, otherwise, to predict the inverse quantized DC coefficient of block X from block A;
an inverse quantizer having an input coupled to the gradient analyzer and an output for inverse quantized coefficient data of the blocks; and
an inverse discrete cosine transform circuit having an input coupled to the inverse quantizer and an output for decoded data of the blocks;
wherein $DC_A$, $DC_B$ and $DC_C$ respectively represent inverse quantized DC coefficients of blocks A, B and C, and block A is left of block X, block C is above block X and block B is above-left of block X.

35. The video decoder of claim 34, further comprising a predictor to generate a predicted DC coefficient of block X from the predicted DC coefficient of block X and a DC residual value of block X output from the variable length decoder.

36. The video decoder of claim 34, wherein, when prediction occurs from block C, the variable length decoder is to organize received AC coefficients of block X into an array according to a scan direction identified in Table 5.

37. The video decoder of claim 34, wherein, when prediction occurs from block A, the variable length decoder is to organize received AC coefficients of block X into an array according to a scan direction identified in Table 6.

38. The video decoder of claim 34, wherein, when an AC prediction flag indicates that AC prediction was not used, the variable length decoder is to organize received AC coefficients of block X into an array according to a zig-zag scan direction.

39. The video decoder of claim 34, wherein the gradient analyzer further comprises an AC coefficient predictor.

40. The video decoder of claim 39, wherein, when the DC coefficient of block X is predicted from block C, the AC coefficient predictor is to predict a row of AC coefficients for block X that are co-located with the DC coefficient from a corresponding row in block C.

41. The video decoder of claim 39, wherein, when the DC coefficient of block X is predicted from block A, the AC coefficient predictor is to predict a column of AC coefficients for block X that are co-located with the DC coefficient from a corresponding column in block A.

42. A video encoder, comprising:
a discrete cosine transform circuit having an input for blocks of video data and an output for DCT coefficients of the blocks;
a quantizer having an input coupled to the output of the discrete cosine transform circuit and an output for quantized coefficient data of the blocks;
a gradient analyzer having an input coupled to the output of the quantizer and an output for predicted coefficient data of the blocks, the gradient analyzer to predict a DC coefficient of a block X from a neighboring block C if $|DC_A-DC_B|<|DC_B-DC_C|$ and, otherwise, to predict the DC coefficient of block X from another neighboring block A; and
a variable length encoder, having an input coupled to the gradient analyzer and an output for run length coded data of the blocks,
wherein $DC_A$, $DC_B$ and $DC_C$ respectively represent DC coefficients of blocks A, B and C, and block A is left of block X, block C is above block X and block B is above-left of block X.

43. The video encoder of claim 42, further comprising a predictor to generate a residual DC coefficient of block X from a comparison of an actual DC coefficient of block X and the predicted DC coefficient of block X.

44. The video encoder of claim 42, wherein, when prediction occurs from block C, the variable length encoder is to output coefficients of block X according to a scan order identified in Table 5.

45. The video encoder of claim 42, wherein, when prediction occurs from block A, the variable length encoder is to output coefficients of block X according to a scan order identified in Table 6.

46. The video encoder of claim 42, wherein the gradient analyzer further comprises an AC coefficient predictor.

47. The video encoder of claim 46, wherein, when the DC coefficient of block X is predicted from block C, the AC coefficient predictor is to predict a row of AC coefficients for block X that are co-located with the DC coefficient from a corresponding row in block C.

48. The video encoder of claim 46, wherein, when the DC coefficient of block X is predicted from block A, the AC coefficient predictor is to predict a column of AC coefficients for block X that are co-located with the DC coefficient from a corresponding column in block A.

49. The video encoder of claim 42, wherein, when an AC predictor does not predict AC coefficient of block X, the variable length encoder is to output coefficients of block X according to a zig-zag scan order.

50. A prediction direction selection circuit for a video decoder, comprising:
an input for a current block X of video data to be decoded;
an input for decoded data of a block A to the left of the current block X, a block B to the above-left of the current block X and a block C above the current block X; and
a selection circuit to predict video data of block X using decoded data from block C if $|DC_A-DC_B|<|DC_B-DC_C|$ and otherwise to predict the video data of block X using decoded data from block A,
wherein $DC_A$, $DC_B$ and $DC_C$ respectively represent decoded data of blocks A, B and C.

51. The prediction direction selection circuit of claim 50, further comprising a predictor to generate coefficient data of block X as a sum of the predicted data of block X and a residual value received from a channel.

52. The prediction direction selection circuit of claim 50, wherein $DC_A$, $DC_B$ and $DC_C$ respectively are inverse quantized DC values of a discrete cosine transform of data in blocks A, B or C.

53. The prediction direction selection circuit of claim 50, further comprising a run length decoder to apply a scan direction identified in Table 5 when prediction occurs from block C.

54. The prediction direction selection circuit of claim 50, further comprising a run length decoder to apply a scan direction identified in Table 6 when prediction occurs from block A.

55. The prediction direction selection circuit of claim 50, further comprising, a run length decoder to apply a zig-zag scan direction when an AC prediction flag indicates that AC prediction was not used.

56. The prediction direction selection circuit of claim 50, further comprising an AC predictor to predict a row of AC coefficients in block X from co-located AC coefficients in block C when prediction occurs from block C.

57. The prediction direction selection circuit of claim 50, further comprising an AC predictor to predict a column of AC coefficients in block X from co-located AC coefficients in block A when predicting from block A.

58. A prediction direction selection circuit for a video encoder, comprising:
- an input for a current block X of video data to be coded;
- an input for coded data of a block A to the left of the current block X, a block B to the above-left of the current block X and a block C above the current block X; and
- a selection circuit to predict video data of block X using data from block C if $|DC_A-DC_B|<|DC_B-DC_C|$ and otherwise to predict the video data of block X using data from block A,
- wherein $DC_A$, $DC_B$ and $DC_C$ respectively represent data of blocks A, B and C.

59. The prediction direction selection circuit of claim 58, further comprising a predictor to generate a residual signal for block X from a subtraction of an actual data of block X from a predicted value of the data of block X.

60. The prediction direction selection circuit of claim 58, wherein $DC_A$, $DC_B$ and $DC_C$ respectively are quantized DC values of a discrete cosine transform of data in blocks A, B or C.

61. The prediction direction selection circuit of claim 58, further comprising a run length coder to apply a scan direction identified in Table 5 when prediction occurs from block C.

62. The prediction direction selection circuit of claim 58, further comprising a run length coder to apply a scan direction identified in Table 6 when prediction occurs from block A.

63. The prediction direction selection circuit of claim 58, further comprising, a run length coder to apply a zig-zag scan direction when an AC prediction flag indicates that AC prediction was not used.

64. The prediction direction selection circuit of claim 58, further comprising an AC predictor to predict a row of AC coefficients in block X from co-located AC coefficients in block C when prediction occurs from block C.

65. The prediction direction selection circuit of claim 58, further comprising an AC predictor to predict a column of AC coefficients in block X from co-located AC coefficients in block A when predicting from block A.

* * * * *

UNITED STATES PATENT AND TRADEMARK OFFICE
CERTIFICATE OF CORRECTION

PATENT NO. : 7,092,445 B2
APPLICATION NO. : 10/331344
DATED : August 15, 2006
INVENTOR(S) : Barin Geoffry Haskell et al.

It is certified that error appears in the above-identified patent and that said Letters Patent is hereby corrected as shown below:

At Column 12, line 38, after "block A;" insert --and--.
At Column 12, line 58, change "wherein," to --wherein--.
At Column 13, line 46, change "wherein;" to --wherein--.
At Column 14, line 65, change "a row" to --row--.
At Column 15, line 5, change "a column" to --column--.
At Column 15, line 25, change "blocks;" to --blocks,--.
At Column 15, line 17, change $|DC_A-DC_N|<DC_B-DC_C|$ to $|DC_A-DC_B|<|DC_B-DC_C|$.
At Column 16, line 5, change $|DC_A-DC_B|<DC_B-DC_C|$ to $|DC_A-DC_B|<|DC_B-DC_C|$.
At Column 16, line 40, change "coefficient" to --coefficients--.
At Column 16, line 51, change $|DC_A-DC_{B|<DCB} -DC_C|$ to $|DC_A-DC_B|<|DC_B-DC_C|$.
At Column 17, line 6, change "comprising," to --comprising--.
At Column 18, line 18, change "comprising," to --comprising--.

Signed and Sealed this

Twenty-first Day of November, 2006

JON W. DUDAS
*Director of the United States Patent and Trademark Office*